United States Patent
Zheng

(10) Patent No.: US 8,193,975 B2
(45) Date of Patent: Jun. 5, 2012

(54) ITERATIVE ANTENNA BEAM FORMING SYSTEMS/METHODS

(75) Inventor: Dunmin Zheng, Vienna, VA (US)

(73) Assignee: ATC Technologies, Reston, VA (US)

( * ) Notice: Subject to any disclaimer, the term of this patent is extended or adjusted under 35 U.S.C. 154(b) by 231 days.

(21) Appl. No.: 12/603,911

(22) Filed: Oct. 22, 2009

(65) Prior Publication Data

US 2010/0117903 A1    May 13, 2010

Related U.S. Application Data

(60) Provisional application No. 61/113,863, filed on Nov. 12, 2008.

(51) Int. Cl.
*H04B 7/185* (2006.01)
*H01Q 3/26* (2006.01)

(52) U.S. Cl. ........................................ 342/354; 342/377

(58) Field of Classification Search ................... 342/354, 342/377
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |

(Continued)

FOREIGN PATENT DOCUMENTS

EP    0 506 255 A2    9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Gregory C Issing
(74) *Attorney, Agent, or Firm* — Myers Bigel Sibley & Sajovec

(57) ABSTRACT

Methods of operating a transceiver including an antenna having a plurality of antenna feed elements are presented. The methods include defining a plurality of antenna gain constraint values $g_k$ associated with K geographic constraint points within a geographic region, iteratively generating M antenna feed element weights $w_M$ that result in antenna response values $f_K$ at the K geographic constraint points based on the corresponding antenna gain constraint values $g_K$, forming an antenna beam from the antenna to the geographic region using the antenna feed element weights $w_M$, and communicating information over the antenna beam. Related transceivers, satellites, and satellite gateways are also disclosed.

28 Claims, 8 Drawing Sheets

U.S. PATENT DOCUMENTS

| | | | |
|---|---|---|---|
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,154,661 A * | 11/2000 | Goldburg | 455/562.1 |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,188,896 B1 * | 2/2001 | Perahia et al. | 455/428 |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,340,949 B1 | 1/2002 | Lane et al. | |
| 6,418,147 B1 | 7/2002 | Wiedeman | |
| 6,449,461 B1 | 9/2002 | Otten | |
| 6,490,448 B1 * | 12/2002 | Hogberg et al. | 455/427 |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,155,340 B2 | 12/2006 | Churan | |
| 7,174,127 B2 | 2/2007 | Otten et al. | |
| 7,181,161 B2 | 2/2007 | Karabinis | |
| 7,203,490 B2 | 4/2007 | Karabinis | |
| 7,218,931 B2 | 5/2007 | Karabinis | |
| 7,295,807 B2 | 11/2007 | Karabinis | |
| 7,299,071 B1 * | 11/2007 | Barratt et al. | 455/562.1 |
| 7,340,213 B2 | 3/2008 | Karabinis et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,453,920 B2 | 11/2008 | Churan | |
| 7,454,175 B2 | 11/2008 | Karabinis | |
| 7,457,269 B1 | 11/2008 | Grayson | |
| 7,558,568 B2 | 7/2009 | Karabinis | |
| 7,574,206 B2 | 8/2009 | Karabinis | |
| 7,577,400 B2 | 8/2009 | Karabinis et al. | |
| 7,587,171 B2 | 9/2009 | Evans et al. | |
| 7,593,691 B2 | 9/2009 | Karabinis | |
| 7,593,724 B2 | 9/2009 | Karabinis | |
| 7,593,725 B2 | 9/2009 | Karabinis | |
| 7,593,726 B2 | 9/2009 | Karabinis et al. | |
| 7,596,111 B2 | 9/2009 | Karabinis | |
| 7,599,656 B2 | 10/2009 | Karabinis | |
| 7,602,837 B2 | 10/2009 | Kotecha | |
| 7,603,081 B2 | 10/2009 | Karabinis | |
| 7,603,117 B2 | 10/2009 | Karabinis | |
| 7,606,590 B2 | 10/2009 | Karabinis | |
| 7,609,666 B2 | 10/2009 | Karabinis | |
| 7,620,394 B2 | 11/2009 | Good et al. | |
| 7,623,859 B2 | 11/2009 | Karabinis | |
| 7,623,867 B2 | 11/2009 | Karabinis | |
| 7,627,285 B2 | 12/2009 | Karabinis | |
| 7,634,229 B2 | 12/2009 | Karabinis | |
| 7,634,234 B2 | 12/2009 | Karabinis | |
| 7,636,546 B2 | 12/2009 | Karabinis | |
| 7,636,566 B2 | 12/2009 | Karabinis | |
| 7,636,567 B2 | 12/2009 | Karabinis et al. | |
| 7,639,981 B2 | 12/2009 | Karabinis | |
| 7,653,348 B2 | 1/2010 | Karabinis | |
| 7,664,460 B2 | 2/2010 | Karabinis et al. | |
| 7,696,924 B2 | 4/2010 | Levin et al. | |
| 7,978,135 B2 * | 7/2011 | Churan | 342/377 |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0149986 A1 | 8/2003 | Mayfield et al. | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0203393 A1 | 10/2004 | Chen | |
| 2004/0240525 A1 | 12/2004 | Karabinis et al. | |
| 2005/0041619 A1 | 2/2005 | Karabinis et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0181786 A1 | 8/2005 | Karabinis et al. | |
| 2005/0201449 A1 | 9/2005 | Churan | |
| 2005/0227618 A1 | 10/2005 | Karabinis et al. | |
| 2005/0239399 A1 | 10/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0288011 A1 | 12/2005 | Dutta | |
| 2006/0040613 A1 | 2/2006 | Karabinis et al. | |
| 2006/0094420 A1 | 5/2006 | Karabinis | |
| 2006/0111041 A1 | 5/2006 | Karabinis | |
| 2006/0111056 A1 | 5/2006 | Dutta | |
| 2006/0135058 A1 | 6/2006 | Karabinis | |
| 2006/0135070 A1 | 6/2006 | Karabinis | |
| 2006/0165120 A1 | 7/2006 | Karabinis | |
| 2006/0189275 A1 | 8/2006 | Karabinis | |
| 2006/0194576 A1 | 8/2006 | Karabinis et al. | |
| 2006/0205347 A1 | 9/2006 | Karabinis | |
| 2006/0205367 A1 | 9/2006 | Karabinis | |
| 2006/0211452 A1 | 9/2006 | Karabinis | |
| 2006/0217070 A1 | 9/2006 | Karabinis | |
| 2006/0246838 A1 | 11/2006 | Karabinis | |
| 2006/0252368 A1 | 11/2006 | Karabinis | |
| 2006/0292990 A1 | 12/2006 | Karabinis et al. | |
| 2007/0010246 A1 | 1/2007 | Churan | |
| 2007/0015460 A1 | 1/2007 | Karabinis et al. | |
| 2007/0021059 A1 | 1/2007 | Karabinis et al. | |
| 2007/0021060 A1 | 1/2007 | Karabinis et al. | |
| 2007/0037514 A1 | 2/2007 | Karabinis | |
| 2007/0072545 A1 | 3/2007 | Karabinis et al. | |
| 2007/0092019 A1 * | 4/2007 | Kotecha et al. | 375/267 |
| 2007/0099562 A1 | 5/2007 | Karabinis et al. | |

| | | | |
|---|---|---|---|
| 2007/0123252 A1 | 5/2007 | Tronc et al. | |
| 2007/0129019 A1 | 6/2007 | Otten et al. | |
| 2007/0135051 A1 | 6/2007 | Zheng et al. | |
| 2007/0184849 A1 | 8/2007 | Zheng | |
| 2007/0192805 A1 | 8/2007 | Dutta et al. | |
| 2007/0202816 A1 | 8/2007 | Zheng | |
| 2007/0232298 A1 | 10/2007 | Karabinis | |
| 2007/0243866 A1 | 10/2007 | Karabinis | |
| 2007/0281612 A1 | 12/2007 | Benjamin et al. | |
| 2007/0293214 A1 | 12/2007 | Ansari et al. | |
| 2008/0008264 A1 | 1/2008 | Zheng | |
| 2008/0032671 A1 | 2/2008 | Karabinis | |
| 2008/0032690 A1 | 2/2008 | Karabinis | |
| 2008/0113666 A1 | 5/2008 | Monte et al. | |
| 2008/0119190 A1 | 5/2008 | Karabinis | |
| 2008/0160993 A1 | 7/2008 | Levin et al. | |
| 2008/0182572 A1 | 7/2008 | Tseytlin et al. | |
| 2008/0204319 A1* | 8/2008 | Niu et al. | 342/368 |
| 2008/0214207 A1 | 9/2008 | Karabinis | |
| 2008/0268836 A1 | 10/2008 | Karabinis et al. | |
| 2009/0011704 A1 | 1/2009 | Karabinis | |
| 2009/0029696 A1 | 1/2009 | Karabinis | |
| 2009/0042509 A1 | 2/2009 | Karabinis et al. | |
| 2009/0042516 A1 | 2/2009 | Karabinis | |
| 2009/0075645 A1 | 3/2009 | Karabinis | |
| 2009/0088151 A1 | 4/2009 | Karabinis | |
| 2009/0104903 A1 | 4/2009 | Karabinis | |
| 2009/0131046 A1 | 5/2009 | Karabinis et al. | |
| 2009/0137203 A1 | 5/2009 | Karabinis et al. | |
| 2009/0156154 A1 | 6/2009 | Karabinis et al. | |
| 2009/0170427 A1 | 7/2009 | Karabinis | |
| 2009/0170428 A1 | 7/2009 | Karabinis | |
| 2009/0170429 A1 | 7/2009 | Karabinis | |
| 2009/0186622 A1 | 7/2009 | Karabinis | |
| 2009/0231187 A1 | 9/2009 | Churan | |
| 2009/0233545 A1* | 9/2009 | Sutskover et al. | 455/25 |
| 2009/0264120 A1 | 10/2009 | Karabinis | |
| 2009/0296628 A1 | 12/2009 | Karabinis | |
| 2009/0305697 A1 | 12/2009 | Karabinis et al. | |
| 2009/0312013 A1 | 12/2009 | Karabinis | |
| 2010/0009677 A1 | 1/2010 | Karabinis et al. | |
| 2010/0015971 A1 | 1/2010 | Good et al. | |
| 2010/0029269 A1 | 2/2010 | Karabinis | |
| 2010/0035604 A1 | 2/2010 | Dutta et al. | |
| 2010/0035605 A1 | 2/2010 | Karabinis | |
| 2010/0035606 A1 | 2/2010 | Karabinis | |
| 2010/0039967 A1 | 2/2010 | Karabinis et al. | |
| 2010/0041394 A1 | 2/2010 | Karabinis | |
| 2010/0041395 A1 | 2/2010 | Karabinis | |
| 2010/0041396 A1 | 2/2010 | Karabinis | |
| 2010/0048201 A1 | 2/2010 | Karabinis | |
| 2010/0054160 A1 | 3/2010 | Karabinis | |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |
| WO | WO 02/51033 A1 | 6/2002 |
| WO | WO 2009/102486 A2 | 8/2009 |

OTHER PUBLICATIONS

Ayyagari et al., "A satellite-augmented cellular network concept", *Wireless Networks*, Vo. 4, 1998, pp. 189-198.

International Search Report dated Jan. 27, 2010, for corresponding PCT Application No. PCT/US2009/062349, filed Oct. 28, 2009.

Farsakh et al. "Spatial Covariance Based Downlink Beamforming in an SDMA Mobile Radio System" IEEE Transactions on Communications, vol. 46, No. 11 pp. 1497-1506 (1998).

Suzuki et al. "Phased array fed reflector antennas with interpolation network for next generation mobile satellite communication systems" Antennas and Propagation Society Symposium, 2004. vol. 3, pp. 3043-3046.

International Search Report dated Nov. 30, 2009, for corresponding PCT Application No. PCT/US2009/000944, filed Feb. 13, 2009.

Gebauer et al. "Channel-Individual Adaptive Beamforming for Mobile Satellite Communications" IEEE. Journal on Selected Areas in Communications, vol. 13, No. 2, pp. 439-448 (1995).

Mao et al. "Investigation of DBF Co-Channel Signal Separation and Suppression for Mobile Satellite Communications" Vehicular Technology Conference. vol. 5, No. 19, pp. 2731-2734 (1999).

Takao et al. "An Adaptive Antenna Array Under Directional Constraint" Antennas and Propagation, IEEE. vol. AP-24, No. 05, pp. 662-669 (1976-2009).

* cited by examiner

ITERATIVE ANTENNA BEAM FORMING SYSTEMS/METHODS

CROSS REFERENCE TO RELATED APPLICATION

This application claims the benefit of and priority to U.S. Provisional Patent Application No. 61/113,863, filed Nov. 12, 2008, entitled "Optimal Beamforming Based on Non-Linear Least Squares Criterion," the disclosure of which is hereby incorporated herein by reference as if set forth in its entirety.

FIELD OF THE INVENTION

This invention relates to wireless communications systems and methods, and more particularly to antenna systems and methods for terrestrial and/or satellite wireless communications systems.

BACKGROUND

Beam forming refers to a technique of shaping an antenna gain pattern to improve communications using the antenna. In particular, beam forming refers to techniques for selecting complex weight coefficients ("weights") for antenna feed elements in a multi-element antenna. Signals to be transmitted from the antenna elements are multiplied by respective weights prior to transmission. Signals received by the antenna elements are multiplied by respective weights before being combined for processing.

Beam forming techniques have been applied to many modern mobile satellite systems (MSS). With multiple transmitting and receiving antenna feed elements, a satellite beam former forms a plurality of service area spot-beams (or cells) in both the forward link and/or the reverse link by using advanced antenna array signal processing. Beam forming can increase the average signal to noise and/or signal to interference ratio by focusing energy into desired directions in the forward link and/or the reverse link. By estimating the response to each antenna element to a given user or a given location, and possible interference signals, a satellite/gateway can combine the elements with weights obtained as a function of each element response to improve the average desired signal and reduce other components, whether noise, interference or both. The spot-beams may be, for example, either fixed to an area or adaptive to particular users and/or interference environments depending, for example, on application scenarios and/or design considerations.

SUMMARY

Methods of operating a transceiver including an antenna having a plurality of antenna feed elements according to some embodiments are presented. The methods include defining a plurality of antenna gain constraint values $g_k$ associated with K geographic constraint points within a geographic region, iteratively generating M antenna feed element weights $w_M$ that result in antenna response values $f_K$ at the K geographic constraint points based on the corresponding antenna gain constraint values $g_K$ until the antenna feed element weights $w_M$ converge, forming an antenna beam from the antenna to the geographic region using the antenna feed element weights $w_M$, and communicating information over the antenna beam.

Iteratively generating the antenna feed element weights may include defining a cost function that relates the antenna gain constraint values $g_K$ to the antenna feed element weights $w_M$, specifying an initial vector $w^1$ of the antenna feed element weights $w_M$, evaluating the cost function using the initial vector $w^1$ of the antenna feed element weights $w_M$, iteratively modifying the antenna weights and evaluating the cost function using the antenna feed element weights $w_M$ while the value of the cost function is decreasing, and selecting a vector of the antenna feed element weights in response to the value of the cost function no longer decreasing in response to modifying the antenna weights.

The initial weight vector may include a conjugate of a beam steering center.

The methods may further include generating a gradient of the cost function, modifying the antenna weights may include adjusting the weights in the direction of the gradient of the cost function.

Adjusting the antenna weights may include adjusting the weights by a fixed step size in the direction of the gradient of the cost function.

The cost function may include a sum of squared differences between the antenna gain constraint values $g_k$ and the antenna response values $f_k$ at the K geographic constraint points.

The methods may further include weighting the squared differences between the antenna gain constraint values $g_k$ and the antenna response values $f_k$ using weighting factors.

Modifying the antenna weights may include adjusting the weights by a weight shift vector $\Delta w$.

The methods may further include generating the weight shift vector $\Delta w$ based on a set of linearized equations representing the antenna response values $f_k$ at the K geographic constraint points.

The methods may further include generating a residual error vector in terms of the weight shift vector $\Delta w$, generating a matrix Q that represents partial derivatives of the K antenna beam gain responses with respect to the M feed element weights in response to the residual error vector, forming a vector $\Delta g$ that represents differences between the actual and desired beam gain responses at each of the K locations of interest, evaluating the cost function using the matrix Q and the vector $\Delta g$ to form a set of linear equations that relate the vector $\Delta g$ to the weight shift vector $\Delta w$, and solving the set of linear equations to find the weight shift vector $\Delta w$.

The cost function may include a sum of squared differences between the antenna gain constraint values $g_k$ and the antenna response values $f_k$ at the K geographic constraint points.

The methods may further include weighting the squared differences between the antenna gain constraint values $g_k$ and the antenna response values $f_k$ using weighting factors.

A transceiver according to some embodiments includes an antenna having a plurality of antenna feed elements, and an electronics system including a beam former configured to iteratively generate M antenna feed element weights $w_M$ that result in antenna response values $f_K$ at K geographic constraint points based on corresponding antenna gain constraint values $g_K$ until the antenna feed element weights $w_M$ converge, and to form an antenna beam from the antenna to the geographic region using the antenna feed element weights.

A communications satellite according to some embodiments includes an antenna having a plurality of antenna feed elements, and an electronics system including a beam former configured to iteratively generate M antenna feed element weights $w_M$ that result in antenna response values $f_K$ at K geographic constraint points based on corresponding antenna gain constraint values $g_K$ until the antenna feed element weights $w_M$ converge, and to form an antenna beam from the antenna to the geographic region using the antenna feed element weights.

A satellite gateway according to some embodiments includes an electronics system including a beam former configured to iteratively generate M antenna feed element weights $w_M$ for antenna feed elements of an antenna of a remote satellite that result in antenna response values $f_K$ at K geographic constraint points based on corresponding antenna gain constraint values $g_K$ until the antenna feed element weights $w_M$ converge, and to transmit the complex valued antenna feed element weights to the satellite for use in forming an antenna beam from the satellite antenna to the geographic region.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1A:
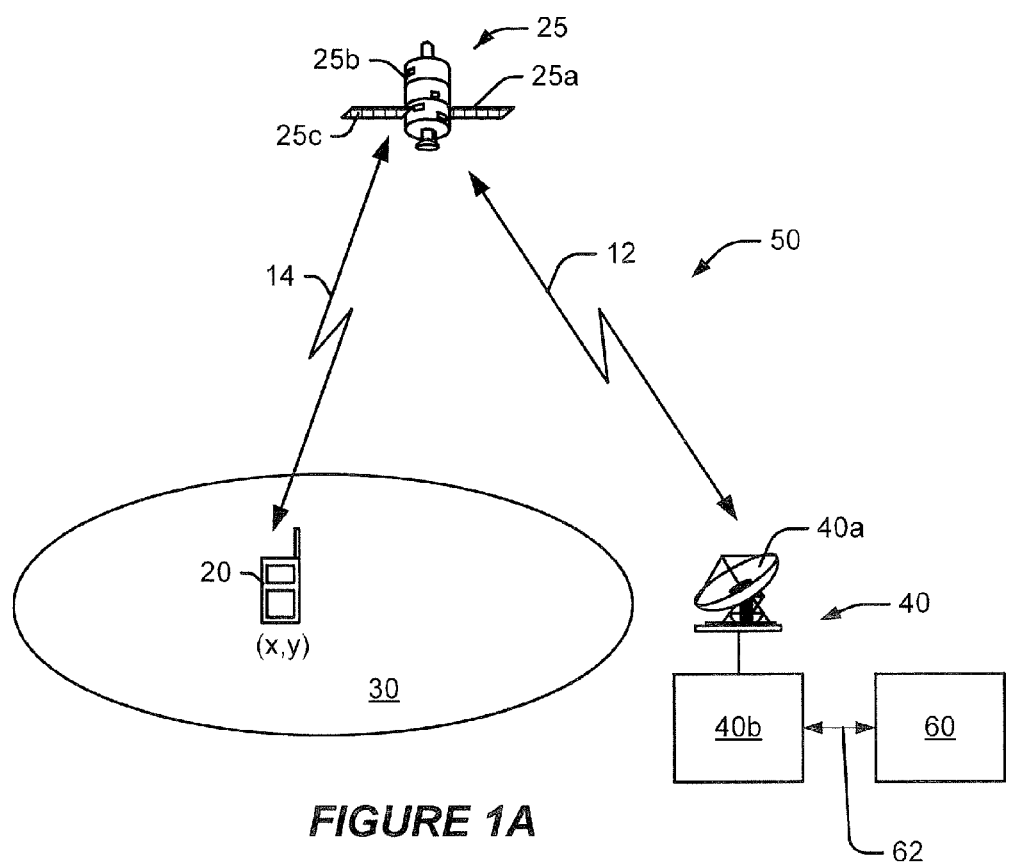
FIG. 1A illustrates exemplary communications systems/methods according to some embodiments.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Beam forming techniques have been applied to many communications systems, including mobile satellite systems (MSS). With multiple transmitting and receiving antenna feed elements, a satellite beam former may form a plurality of service area spot-beams (or cells) in the forward link and/or the reverse link by using advanced antenna array signal processing. A goal of beam forming is to increase the average signal to noise and/or signal to interference ratio of a link by focusing energy into desired directions in either the forward link or the reverse link. By estimating the response to each antenna element to a given user or a given location, and possible interference signals, a satellite/gateway can combine the elements with weights obtained as a function of each element response to improve the average desired signal and/or to reduce other components, such as noise, interference or both. The spot-beams may be, for example, either fixed to an area or adaptive to particular users and/or interference environments depending, for example, on application scenarios and/or design considerations.

A system 50 according to some embodiments is illustrated in FIG. 1A. Although embodiments are described herein in connection with satellite radio communications systems, it will be appreciated that the present invention can be embodied in other types of wireless communications systems, including terrestrial wireless communications systems, fixed and/or mobile wireless communications systems, hybrid satellite/terrestrial communications systems, etc.

Referring to FIG. 1A, a radioterminal 20 is located in a geographic cell, or service area, 30 based on the geographic (x,y) coordinates of the radioterminal 20. The geographic coordinates of the radioterminal 20 may be determined, for example, by a GPS processor (not shown) within the radioterminal 20. The radioterminal 20 is also located within the geographic footprint of a satellite transceiver 25, which may be a low-earth orbiting satellite (LEO), a medium-earth orbiting satellite (MEO), and/or a geostationary satellite (GEO). The satellite transceiver 25, which includes an antenna 25a and an electronics system 25b, communicates with at least one satellite gateway 40, which includes an antenna 40a and an electronics system 40b via a feeder link 12. The satellite antenna 25a may include an array of antenna feed elements 25c, which generate signals covering respective overlapping geographic areas in the geographic footprint of the satellite transceiver 25.

The satellite 25 may communicate with the radioterminal 20 by forming a transmit and/or receive beam toward the satellite service area 30 by appropriately weighting signals transmitted by the antenna feed elements 25c using complex antenna feed element weights. That is, by multiplying the transmitted or received signal by different complex antenna feed element weights for each of the antenna feed elements 25c and simultaneously transmitting/receiving the signal from the antenna feed elements 25c, the signals transmitted/received by the antenna feed elements 25c may combine to produce a desired signal pattern within/from the satellite service area 30.

It will be further appreciated that in some embodiments, the beamforming function may be performed in the electronics system 25b of the satellite 25, in the electronics system 40b of the satellite gateway 40, and/or in a separate beam former 60 that provides the antenna feed element weights to the gateway 40 for transmission to the satellite transceiver 25. For example, the beam former 60 may include a processor configured to generate antenna feed element weights and to provide the antenna feed element weights to the satellite gateway 40 via a communications link 62. Whether implemented in the satellite transceiver 25, the gateway 40 or as a separate beam former 60, the beam former may include a programmed general purpose or special purpose computer or other logic circuit that is configured to generate antenna feed element weights as described below.

Figure 1B:
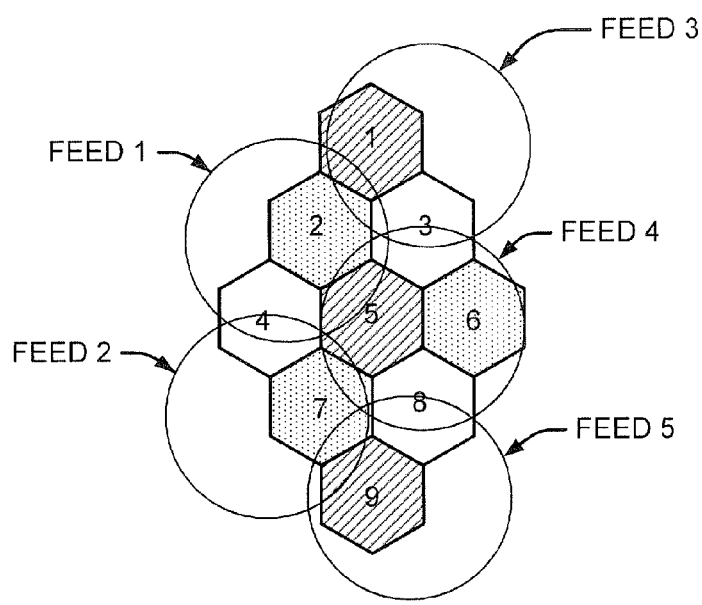
FIG. 1B schematically illustrates an exemplary footprint of five satellite forward link feed elements that are superimposed over a virtual cell configuration.

FIG. 1B schematically illustrates an exemplary footprint of five satellite forward link feed elements that are superimposed over a virtual cell configuration, assuming a frequency reuse ratio of three, for a satellite transmit beamforming system. In FIG. 1B, the idealized footprints of five antenna feed elements are transposed over nine virtual cells defined by their actual physical locations within the satellite footprint. Cells 1, 5 and 9 use a first frequency or set of frequencies, while cells 3, 4 and 8 use a second frequency or set of frequencies and cells 2, 6, and 7 use a third frequency or set of frequencies.

Figure 2:
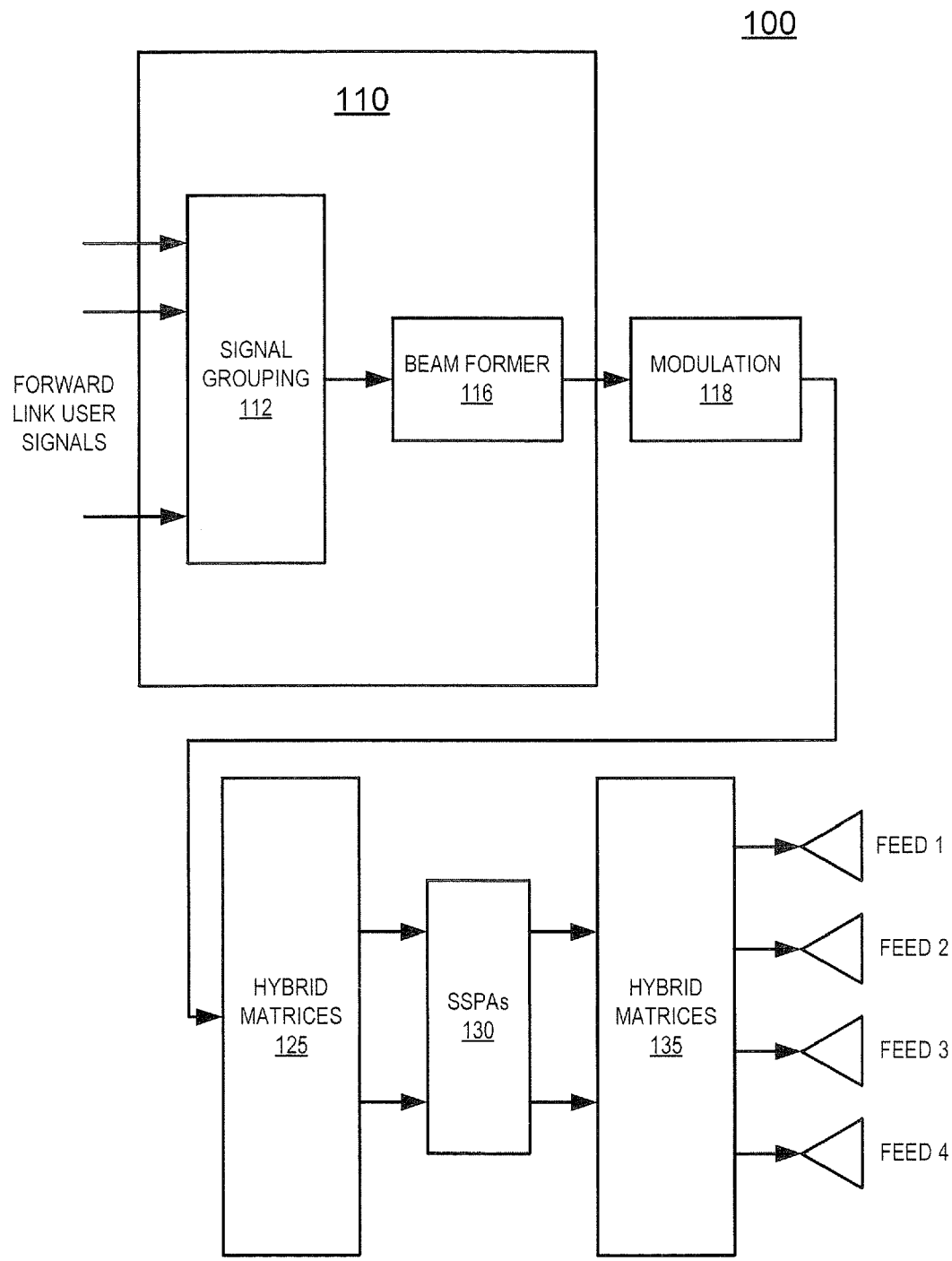
FIG. 2 illustrates a transmitter including a multiple feed antenna according to some embodiments.

A block diagram that illustrates beamforming systems and/or methods for a forward link transmitter 100 according to some embodiments of the invention is shown in FIG. 2. The transmitter 100 may be implemented, for example, in a satellite and/or in a satellite gateway. When the transmitter 100 is implemented in a satellite gateway, the satellite gateway may generate complex antenna weights and transmit the complex antenna weights to a satellite for use in forming a beam from the satellite to a geographic service area 30. Alternatively, a beam former can be located outside the satellite gateway and can generate antenna weights that can be transmitted to the satellite/satellite gateway.

The transmitter 100 includes a controller 110 that is configured to perform certain data processing operations on data signals that are to be transmitted by the transmitter 100. For example, the controller 110 may be configured to perform encoding, interleaving, grouping, and/or other operations. In the transmitter 100, forward link user signals are grouped into N frequency bands and are associated with subgroups of feed elements (block 112). Although four feed elements Feed 1 to Feed 4 are illustrated in FIG. 2, it will be appreciated that more or fewer feed elements could be employed.

Beams are formed by beam formers 116. In beamforming, complex weights are generated for each of the feed elements. Signals transmitted by the feed elements are multiplied by the respective complex weights, resulting in a desired signal gain pattern within the footprint, or geographic service region, of the antenna.

The formed beams are modulated by RF modulation (block 118) and amplified by solid state power amplifiers (SSPAs) 130, and then transmitted by each feed element Feed 1 to Feed M in parallel. In order to equalize the signal input levels applied to the individual transmit amplifiers, and therefore maintain the amplifiers within their proper signal level range, hybrid matrix amplifier configurations are commonly used onboard communication satellites. A typical hybrid matrix amplifier is comprised of a set of N (N=$2^n$, where n is an integer) parallel amplifiers located symmetrically between two, cascaded N-input by N-output multi-port hybrid matrix devices. In a typical hybrid matrix amplifier arrangement, N individual amplifier input signals are supplied by the N outputs of the N×N Input multi-port hybrid matrix 125, and the N SSPAs 130 output signals are similarly applied to the input section of the N×N Output multi-port hybrid matrix 135.

It will be appreciated that the beam formers 116 may form beams in a fixed manner or in an adaptive, closed loop manner, in which measured antenna gain values are fed back to the beam former and used to dynamically adjust the complex antenna feed element weights.

When methods such as Linearly Constrained Minimum Variance (LCMV) are used to generate beam weights from a set of complex feed element patterns, the constraint points used to define the beam constrain the phase as well as amplitude. For beam coverage performance, only the gain over the coverage area may need to be considered, whereas the phase may not need to be considered. However, the specified phase at each constraint point strongly affects the ability to achieve optimum gain performance. To help select the most compatible phase at each constraint point, a two-step process can be performed, where the first step solves the beam weights for a single constraint point at the beam center to determine the "natural" phase distribution at the other constraint points. The second solution step then uses all the constraint points, where the phase constraints are specified from the solution to the first step. This, however, does not guarantee optimum gain performance.

According to some embodiments, systems and methods are presented that can be used to achieve a desired beam response using efficient and robust algorithms that are derived based on a non-linear least squares criterion and that can be implemented using iterative procedures. In conventional methods, such as linear constraint minimum variance (LCMV), both gains and phases for the constraint points are specified. Phase specifications in particular are very difficult to determine. In contrast, in methods according to embodiments of the invention only the desired gain response may be specified. Nevertheless, methods according to embodiments of the invention may still be able to yield superior beam performance in the sense of an exact least squares criterion for gain specifications across all constraint points. Compared with the LCMV algorithm, the algorithms according to the present invention may not only avoid the phase constraints, but also may relax the degree-of-freedom limitation requirement, which allows as many constraint points to be specified as desired.

So called "optimal beamforming" generally has two objectives. The first is to achieve a flat main beam gain response over the coverage area. The second is to form a beam that has side lobes as low as possible, especially for those locations where interference sources may exist. Many efforts have been undertaken to achieve these two objectives, with linear constraint minimum variance (LCMV) being one of most well known algorithms. See, e.g., Frost III, O. L., "An algorithm for linearly constraint adaptive array processing," Proc. IEEE, Vol. 60, pp. 926-935, August 1972.

The LCMV algorithm uses a set of linear constraints to control the shape of the main beam while try to minimize the effect of potential interference sources. The LCMV algorithm requires specifying both gain and phase information for the constraint points. However, the specified phase at each constraint point strongly affects the ability of the LCMV algorithm to achieve optimum gain performance, because the optimal specifications are very difficult to determine. An ideal situation should be that only gain constraints are necessary, because the beam pattern is a gain pattern after all. The phase constraints should be taken out of the equation.

Some efforts have been conducted in trying to eliminate the phase constraint problem with proposed beam forming methods that constrain only the real part of the complex amplitude response at each point, leaving the imaginary part (and hence phase) unconstrained. See, U.S. application Ser. No. 12/370,224, filed Feb. 12, 2009, entitled ANTENNA BEAM FORMING SYSTEMS/METHODS USING UNCONSTRAINED PHASE RESPONSE, assigned to the assignee of the present invention, the disclosure of which is incorporated herein by reference. However, the methods described in U.S. application Ser. No. 12/370,224 may still have a problem controlling the beam shape and overall main beam response flatness, since the beam shape is dependent on the gain response that is not only related to the real part of complex amplitude response but also related to the imaginary part which is not constrained.

In methods according to some embodiments of the present invention, the constraint points are specified with the exact gain constraint information that is desired. The optimal beam forming algorithms are derived based on the non-linear least squares (NLS) criterion and can be implemented in iterative procedures for convergence. The methods are able to yield optimal beam performance in terms of main beam flatness and low side lobes in the sense of exact least squares across all constraint points.

Methods according to some embodiments may avoid solving a set of non-linear equations that have no closed form of solution by performing a gradient search over a cost function performance surface. The gradient search with steepest descent method allows an optimizer/beam former to find a least squares weight solution through a linear iterative process that is shown to be efficient and robust for convergence. Methods according to further embodiments of the present invention also try to avoid having to solve non-linear equations by approximately linearizing a set of residual error equations and solving for the weight shift vector. The weight shift vector is updated iteratively to find a final converged weight vector. Both methods may achieve optimal beam performance in the sense of least squares. Compared with the LCMV algorithm, methods according to embodiments of the present invention may not only avoid the phase constraints, but also relax the degree-of-freedom limitation requirement, which allows as many constraint points to be used as desired, thereby providing additional flexibility to system designers.

The following description is organized as follows. In Section 1, the beamforming problem and mathematical system model are presented. Section 2 describes an adaptive gradient search method according to some embodiments. Iterative beamforming methods according to further embodiments are described in Section 3. Section 4 presents some simulation examples to illustrate the performance of the beam forming systems/methods described herein.

Section 1—System Model

Figure 3:
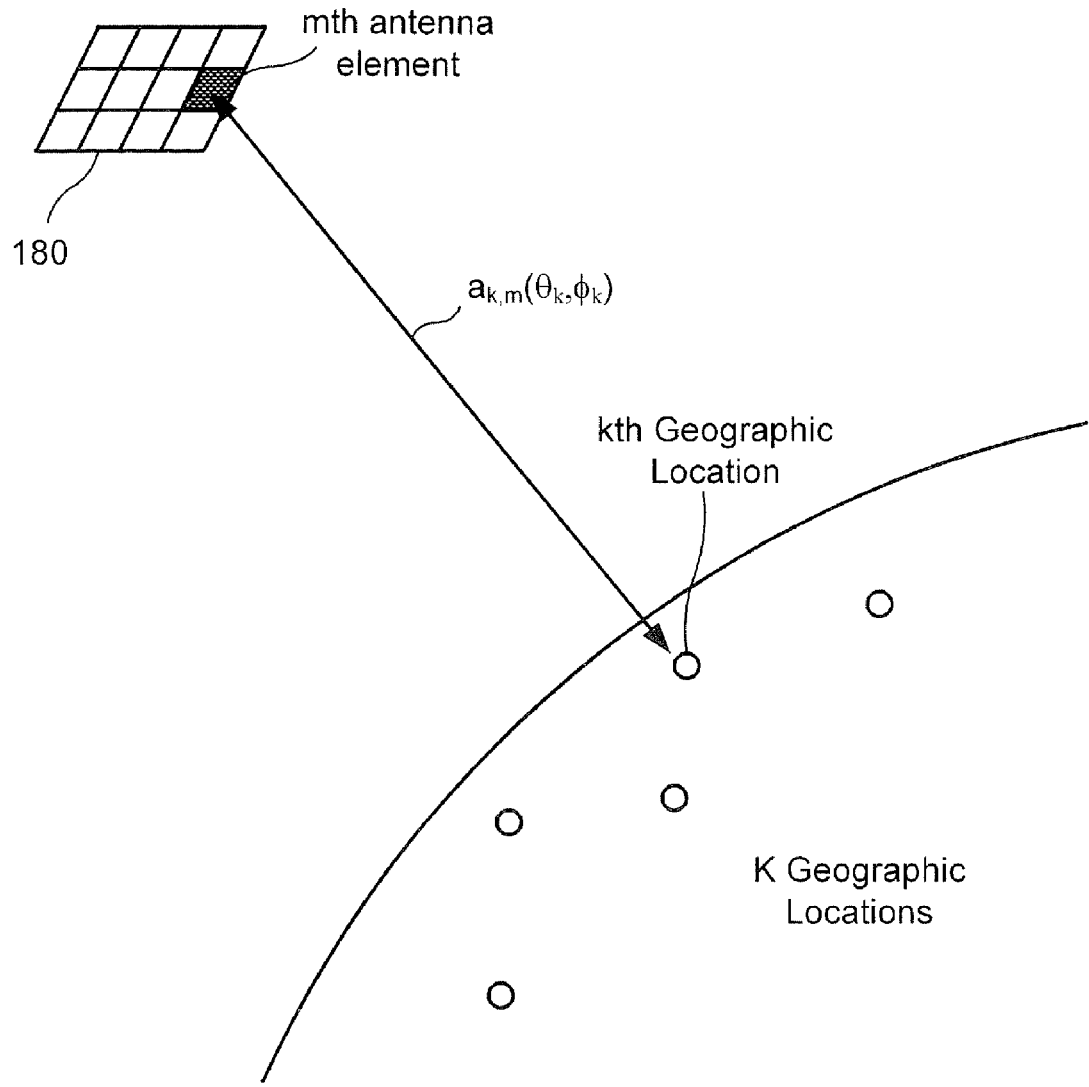
FIG. 3 illustrates parameters of a system including an M-element antenna array configured to generate a beam that is constrained at K geographic locations.

Referring to FIG. 3, a two dimensional (2-D) antenna array 180 having M antenna feed elements is illustrated. The antenna array 180 may be mounted on a vehicle, such as a satellite, aircraft, balloon, etc., or on a fixed structure, such as a tower, building, etc. The $m^{th}$ feed element has the complex response $a_{k,m}(\theta_k, \phi_k)$ at elevation angle $\theta_k$ and azimuth angle $\phi_k$ for the $k^{th}$ location point of K geographic locations within a service area. The array steering vector at the $k^{th}$ location is defined by $$a_k(\theta_k,\phi_k)=[a_{k,1}(\theta_k,\phi_k),\ldots a_{k,M}(\theta_k,\phi_k)]^T \in C^{M\times 1} \quad (1)$$

The beamforming problem is to find a weighting vector $w=[w_1,\ldots w_M]^T \in C^{M\times 1}$ such that at the location $(\theta_k,\phi_k)$, the resulting beam response is $$f_k(w,\theta_k,\phi_k)=w^H a_k(\theta_k,\phi_k) \quad (2)$$

The formed beam is usually defined by complex beam response at all locations of interest. If there are K locations of interest, then the beam response is given by $$F_K(w,\theta,\phi)=[f_1(w,\theta_1,\phi_1),\ldots,f_K(w,\theta_K,\phi_K)]=w^H A_K(\theta,\phi) \quad (3)$$

where $A_K$ is the matrix of complex responses $a_{k,m}$ at the K locations to the M antenna feed elements as follows:

$$A_K(\theta,\phi)=[a_1(\theta_1,\phi_1),\ldots a_K(\theta_K,\phi_K)] \in C^{M\times K} \quad (4)$$

For the formed beam, the beam pattern is given by the gain rather than the phase of the complex beam response. Assuming the desired the beam gain response is defined by $[g_1(\theta_1, \phi_1), \ldots, g_K(\theta_K, \phi_K)]$ for the K locations of interest, the non-linear least squares (NLS) approach finds the weighting vector $w \in C^{M \times 1}$ such that the formed beam pattern matches best the desired gain response in the sense of the least squares. For example, a cost function ($\xi$) can be defined as the sum of residual square errors $\epsilon_k$, where $\epsilon_k$ represents the error between the desired response $g_k$ and the actual response $f_k$ at the kth geographic location of interest, as follows:

$$\xi = \sum_{k=1}^{K} \varepsilon_k^2 = \sum_{k=1}^{K} [|f_k(w, \theta_k, \varphi_k)| - g_k(\theta_k, \varphi_k)]^2 \quad (5)$$

where $$\varepsilon_k = |f_k(w, \theta_k, \varphi_k)| - g_k(\theta_k, \varphi_k) \quad (6)$$

The actual responses beam gain response $f_k$ can be expressed in terms of the weighting vector w and the complex responses $a_{k,m}$, as follows:

$$|f_k(w, \theta_k, \varphi_K)| = \sqrt{f_k(w, \theta_k, \varphi_k) f_k^H(w, \theta_k, \varphi_k)} \quad (7)$$
$$= \sqrt{w^H a_k(\theta_k, \varphi_k) a_k^H(\theta_k, \varphi_k) w}$$

The K locations of interest are also called constraint points. The problem of beamforming based on non-linear least squares criterion is to find a weight vector w that reduces, and in some cases minimizes, the cost function defined in Equation (5).

Figure 4:
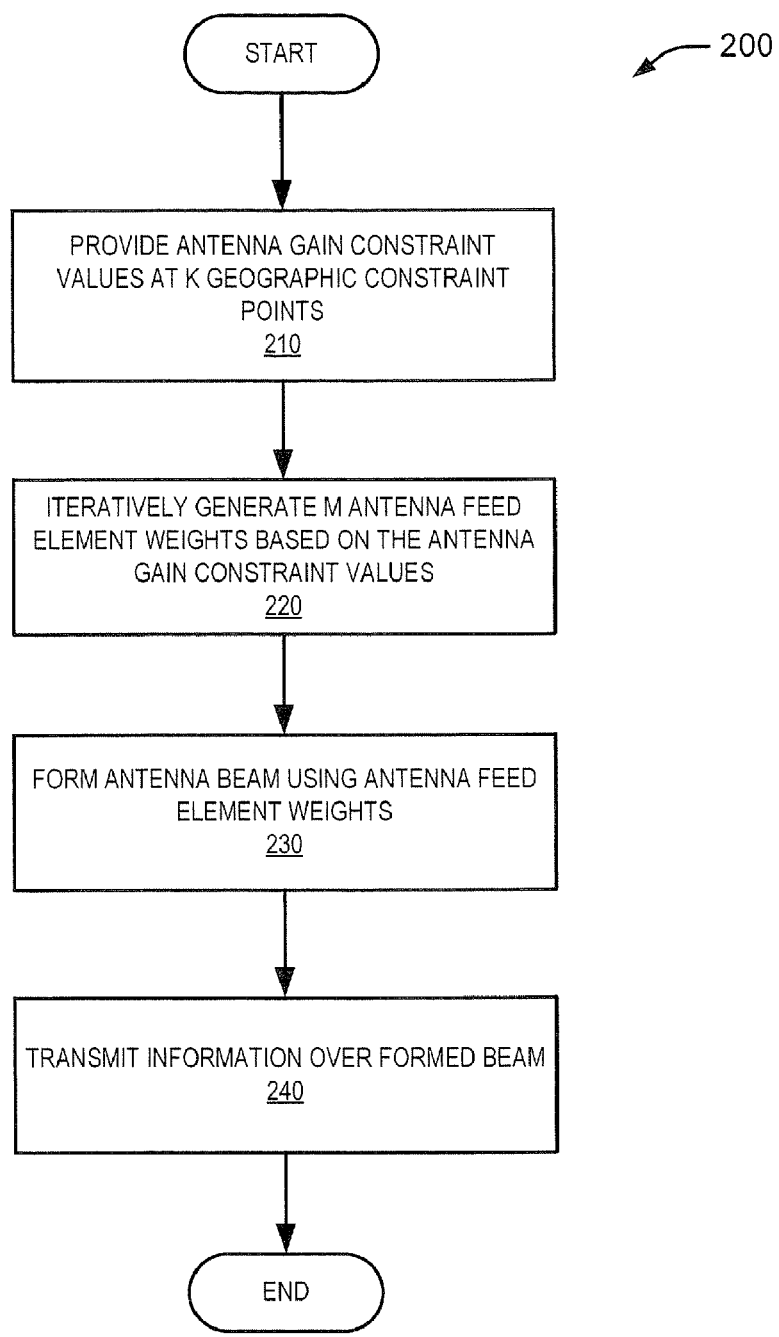
FIGS. 4, 5 and 6 are flowcharts illustrating systems and/or methods according to some embodiments.

In general, the weight vector w may be determined by iteratively generating antenna feed element weights based on the desired antenna gain constraint values. For example, FIG. 4 is a flowchart illustrating operations 200 according to some embodiments. As shown therein, operations according to some embodiments include providing antenna gain constraint values at K geographic constraint points (Block 210). Vectors of antenna feed element weights w are iteratively generated based on the antenna gain constraint values until the antenna feed element weights converge at a desired value (Block 220). As used herein, "converged" means that the antenna feed element weights have reached an acceptable value based on some predefined criterion. For example, in some cases, the antenna feed elements are deemed to have converged when the value of a cost function associated with the feed element weights does not change, or changes less than a predetermined amount, from one iteration to the next, when the value of the cost function ceases to decrease from one iteration to the next, and/or some other predefined criterion.

An antenna beam is then formed using the iteratively generated antenna feed element weights (Block 230), and information is transmitted over the formed beam (Block 240).

Section 2—Gradient Search Beamforming

Among the K constraint points, the desired gain may be different from one point to another. Some of points may correspond to a location of interference at which it may be desirable to have a "null" or zero (or extremely low) gain, while some may require certain non-zero gain constraints such as those inside the main beam lobe. Assuming there are N points for the "zero" constraints and P points for the non-zero constraints, where N+P=K. Then the cost function may be rewritten as $$\xi = \sum_{k=1}^{K} \alpha_k [|f_k(w, \theta_k, \varphi_k)| - g_k(\theta_k, \varphi_k)]^2 \quad (9)$$

$$= \sum_{n=1}^{N} [\alpha_n f_n(w, \theta_n, \phi_n) f_n^H(w, \theta_n, \phi_n)] +$$

$$\sum_{p=1}^{P} \alpha_p \left[ \sqrt{f_p(w, \theta_p, \phi_p) f_p^H(w, \theta_p, \phi_p)} - g_p \right]^2$$

$$= \sum_{n=1}^{N} [\alpha_n f_n(w, \theta_n, \phi_n) f_n^H(w, \theta_n, \phi_n)] +$$

$$\sum_{p=1}^{P} [\alpha_p f_p(w, \theta_p, \phi_p) f_p^H(w, \theta_p, \phi_p)] -$$

$$2 \sum_{p=1}^{P} \left[ \alpha_p g_p \sqrt{f_p(w, \theta_p, \phi_p) f_p^H(w, \theta_p, \phi_p)} \right] + \sum_{p=1}^{P} (\alpha_p g_p^2)$$

$$= F_N(w, \theta, \varphi) \alpha_N F_N^H(w, \theta, \varphi) + F_P(w, \theta, \varphi) \alpha_P F_P^H(w, \theta, \varphi) -$$

$$2 \sum_{p=1}^{P} \left[ \alpha_p g_p \sqrt{f_p(w, \theta_p, \phi_p) f_p^H(w, \theta_p, \phi_p)} \right] + \sum_{p=1}^{P} (\alpha_p g_p^2)$$

where $F_N(w, \theta, \phi)$ and $F_P(w, \theta, \phi)$ are defined in Equation (3), and $$\alpha_N = \text{diag}\{\alpha_1, \alpha_2 \ldots \alpha_N\} \in \mathcal{R}^{N \times N} \quad (10)$$

$$\alpha_P = \text{diag}\{\alpha_1, \alpha_2 \ldots \alpha_P\} \in \mathcal{R}^{P \times P} \quad (11)$$

are user-defined real non-negative weighting factors that provide the ability to emphasize or de-emphasize individual constraint points based on their relative geographic importance.

Using Equation (3), the cost function $\xi$ may be expressed as:

$$\xi = \sum_{n=1}^{N} \left[ \begin{array}{c} \alpha_n w^H a_n(\theta_n, \varphi_n) \\ a_n^H(\theta_n, \varphi_n) w \end{array} \right] + \sum_{p=1}^{P} \left[ \begin{array}{c} \alpha_p w^H a_p(\theta_p, \varphi_p) \\ a_p^H(\theta_p, \varphi_p) w \end{array} \right] - \quad (12)$$

$$2 \sum_{p=1}^{P} \left[ \alpha_p g_p \sqrt{\frac{w^H a_p(\theta_p, \varphi_p)}{a_p^H(\theta_p, \varphi_p) w}} \right] + \sum_{p=1}^{P} (\alpha_p g_p^2)$$

The approach for finding the weight vector w is usually to seek the minimum of the cost function performance surface by setting the gradient of the performance surface to zero. The gradient of the cost function performance surface may be obtained by differentiating with respect to each component of the weight vector, which is given by:

$$\nabla(\xi) = \frac{\partial \xi}{\partial w} \quad (13)$$

$$= \left[ \frac{\partial \xi}{\partial w_1} \frac{\partial \xi}{\partial w_2} \cdots \frac{\partial \xi}{\partial w_M} \right]^T$$

$$= 2R_N w + 2R_P w - 2 \sum_{p=1}^{P} [\alpha_p (w^H a_p a_p^H w)^{-\frac{1}{2}} g_p (a_p a_p^H) w]$$

$$= 2(R_N + R_P) w - 2 \sum_{p=1}^{P} \frac{R_p w \alpha_p g_p}{\sqrt{w^H R_p w}}$$

where $$R_N = A_N \alpha_N A_N^H \quad (14)$$

$$R_P = A_P \alpha_P A_P^H \quad (15)$$

$$R_p = a_p a_p^H \quad (16)$$

Setting the gradient to zero, however, would lead to a non-linear equation with respect to w that does not have a closed form solution.

According to some embodiments, an iterative gradient search using the method of steepest descent may be performed. The weight vector w may be updated at each iteration based on the gradient as follows:

$$w^{i+1} = w^i + \mu(-\nabla^i) \quad (17)$$

where $\mu$ is a constant step size, and i is an iteration number. The weights are adjusted in the direction of the gradient at each step until convergence occurs, for example, when the gradient reaches zero and/or converges close to zero, or otherwise decreases below a threshold level.

Figure 5:
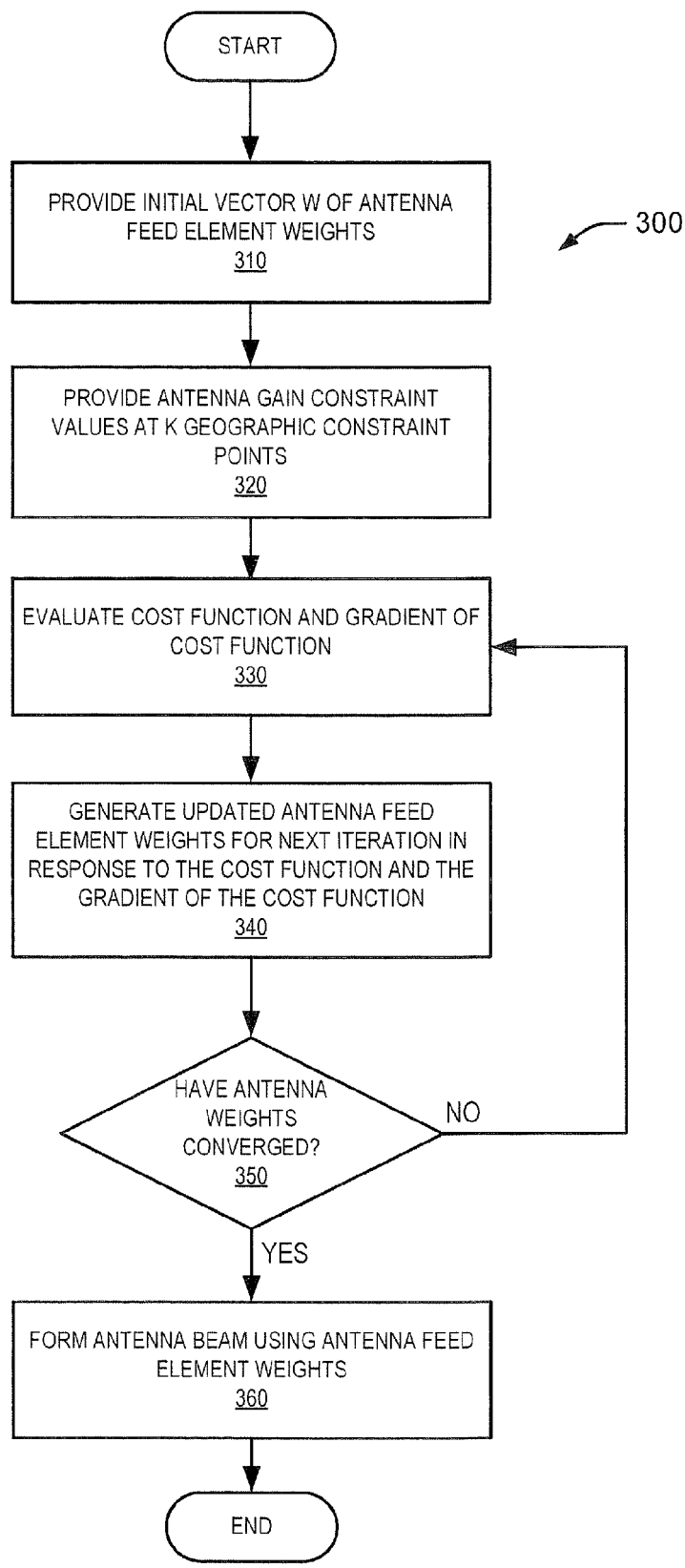

FIG. 5 is a flowchart illustrating operations 300 according to some embodiments of the invention. As shown therein, operations 300 according to some embodiments include providing an initial set of M complex valued antenna feed element weights $w_m$, for example, as the conjugate of a beam center steering vector (Block 310), and providing a plurality of antenna gain constraint values $g_k$ at K geographic constraint points (Block 320).

The cost function $\xi$ and the gradient $\nabla(\xi)$ are evaluated (Block 330), and the antenna feed element weights are updated in response to the cost function and the gradient of the cost function (Block 340). The cost function may also be evaluated at Block 340 in response to the updated antenna feed element weights.

At Block 350, a determination is made as to whether the antenna weight vector has converged, for example, by comparing the value of the cost function at the updated antenna feed element weights to one or more previously calculated values of the cost function. If the antenna weight vector has not converged, the gradient of the cost function is evaluated at the updated antenna feed element weights (Block 330), and a new set of weights is generated (Block 340).

Once the antenna weights have converged, an antenna beam is formed using the converged antenna feed element weights (Block 360).

In some particular embodiments, adaptive beamforming according to some embodiments may be performed according to the following iterative procedures:

1) Find an initial weight vector $w^1$ that may be chosen as conjugate of a beam center steering vector (Block 310).
2) Specify the non-zero constraint point gains, $g_p$, p=1, ... P (Block 320).
3) Specify the weighting factors, $\alpha_p$, p=1, ... P and $\alpha_n$, n=1, ... N. Default values are all ones.
4) Chose a proper step size $\mu$.
5) Compute the gradient according to Equation (13) (Block 330).
6) Compute the value of the cost function as defined in Equation (12) (Block 330).
7) Compute the updated weight $w^2$ for the next iteration according to Equation (17) (Block 340).
8) Repeat the Steps 5), 6) and 7) for the $i^{th}$ iteration.
9) Continue the iterative process until the value of w converges. In some cases, the iterative process may be continued until the values of cost function from two consecutive iterations are no longer decreasing (i.e., continue as long as $\xi^{i+1} < \xi^i$), or until the difference between successive values of the cost function are less than a threshold level.
10) Take the converged w, and normalize it as a final weight vector Section 3—Alternative Iterative Beamforming In other embodiments, a set of residual error equations can be approximately linearized and solved to obtain a weight shift vector $\Delta w$. For example, the gradient $\nabla(\xi)$ of the cost function $\xi$ defined in Equation (5) may be rewritten as $$\nabla(\xi) = \frac{\partial \xi}{\partial w} \quad (18)$$

$$= \left[\frac{\partial \xi}{\partial w_1} \frac{\partial \xi}{\partial w_2} \cdots \frac{\partial \xi}{\partial w_M}\right]^T$$

$$= 2\sum_{k=1}^{K} \varepsilon_k \frac{\partial \varepsilon_k}{\partial w}$$

$$= 2\sum_{k=1}^{K} \varepsilon_k \frac{\partial(|f_k(w, \theta_k, \varphi_k)|)}{\partial w}$$

Setting the gradient $\nabla(\xi)$ in Equation (18) to zero would result in a set of gradient equations that are non-linear and do not have a closed form solution. An alternative approach to solve this problem is to try to use another iterative algorithm, in which the weight parameters are refined iteratively. That is, the antenna feed element weights may be determined by successive approximation as follows:

$$w \approx w^{i+1} = w^i + \Delta w \quad (19)$$

where i is an iteration number and $\Delta w = [\Delta w_1, \ldots \Delta w_M]^T$ is called the weight shift vector.

At each iteration, the model may be linearized by approximation to a first-order Taylor series expansion about $w^i$. A first-order Taylor series expansion can be used to generate an estimate of the value of a function at one point based on the value and slope, or derivative, of the function at another point. For example, the value of the beam response $f_k$ produced in response to a vector w of feed element weights can be estimated in response to the value and slope of the beam response $f_k$ at a particular set $w^i$ of antenna feed element weights. Accordingly the model for the beam response $f_k$ may be linearized as follows:

$$|f_k(w, \theta_k, \varphi_k)| \approx |f_k(w^i, \theta_k, \varphi_k)| + \sum_{m=1}^{M} \frac{\partial(|f_k(w^i, \theta_k, \varphi_k)|)}{\partial w_m} \quad (20)$$

$$(w_m - w_m^i)$$

$$\approx |f_k(w^i, \theta_k, \varphi_k)| + \sum_{m=1}^{M} Q_{k,m} \Delta w_m$$

where $$\frac{\partial(|f_k(w^i, \theta_k, \varphi_k)|)}{\partial w_m} = Q_{k,m} \quad (21)$$

$$\Delta w_m = w_m - w_m^i \quad (22)$$

Thus the residual errors $\varepsilon_k$ defined in (6) may be linearized as follows:

$$\varepsilon_k = |f_k(w, \theta_k, \varphi_k)| - g_k(\theta_k, \varphi_k) \quad (23)$$

$$= |f_k(w^i, \theta_k, \varphi_k)| + \sum_{m=1}^{M} Q_{k,m} \Delta w_m - g_k(\theta_k, \varphi_k)$$

$$= \Delta g_k + \sum_{m=1}^{M} Q_{k,m} \Delta w_m$$

where $$\Delta g_k = |f_k(w^i, \theta_k, \varphi_k)| - g_k(\theta_k, \varphi_k) \quad (24)$$

Submitting Equations (21) and (23) into the gradient Equation (18) and setting the gradient to zero leads to $$\sum_{k=1}^{K} \left[ \Delta g_k + \sum_{j=1}^{M} Q_{k,j} \Delta w_j \right] Q_{k,m} = 0 \quad (25)$$

which may be rearranged to become M linear equations $$\sum_{k=1}^{K} \sum_{j=1}^{M} Q_{k,m} Q_{k,j} \Delta w_j = -\sum_{k=1}^{K} Q_{k,m} \Delta g_k, \quad (26)$$

$$m = 1, 2, \ldots M$$

If user-defined weighting factors for the K constraint points are introduced as $\alpha_k$, k=1, . . . K, for the cost function $$\xi = \sum_{k=1}^{K} \alpha_k \varepsilon_k^2 \quad (27)$$

then the M linear equations become $$\sum_{k=1}^{K} \sum_{j=1}^{M} \alpha_k Q_{k,m} Q_{k,j} \Delta w_j = -\sum_{k=1}^{K} \alpha_k Q_{k,m} \Delta g_k, \quad (28)$$

$$m = 1, 2, \ldots M$$

These linear equations may be expressed in the matrix form as $$(Q\alpha_K Q^T) \Delta w = -(Q\alpha_K) \Delta g \quad (29)$$

where $$Q = [q_1 \; q_2 \; \ldots \; q_K] \in C^{M \times K}$$

with $$q_k = \frac{R_k w}{\sqrt{w^H R_k w}} \quad (30)$$

$$R_k = a_k a_k^H$$

$$\alpha_K = \text{diag}\{\alpha_1, \alpha_2 \; \ldots \; \alpha_K\} \in \mathcal{R}^{K \times K} \quad (31)$$

$$\Delta g = [\Delta g_1 \; \Delta g_2 \; \ldots \; \Delta g_K]^T \in \mathcal{R}^{K \times 1} \quad (32)$$

The weight shift vector $\Delta w$ can be solved, for example, using Cholesky decomposition or other linear algebraic techniques. The weight vector may be updated iteratively according to Equation (19). To increase likelihood of convergence for the iterative process, a constant step size $\mu$, ($0<\mu<1$) may be introduced for reducing the size of shift vector, which may become $$w^{i+1} = w^i + \mu \Delta w^i \quad (33)$$

Figure 6:
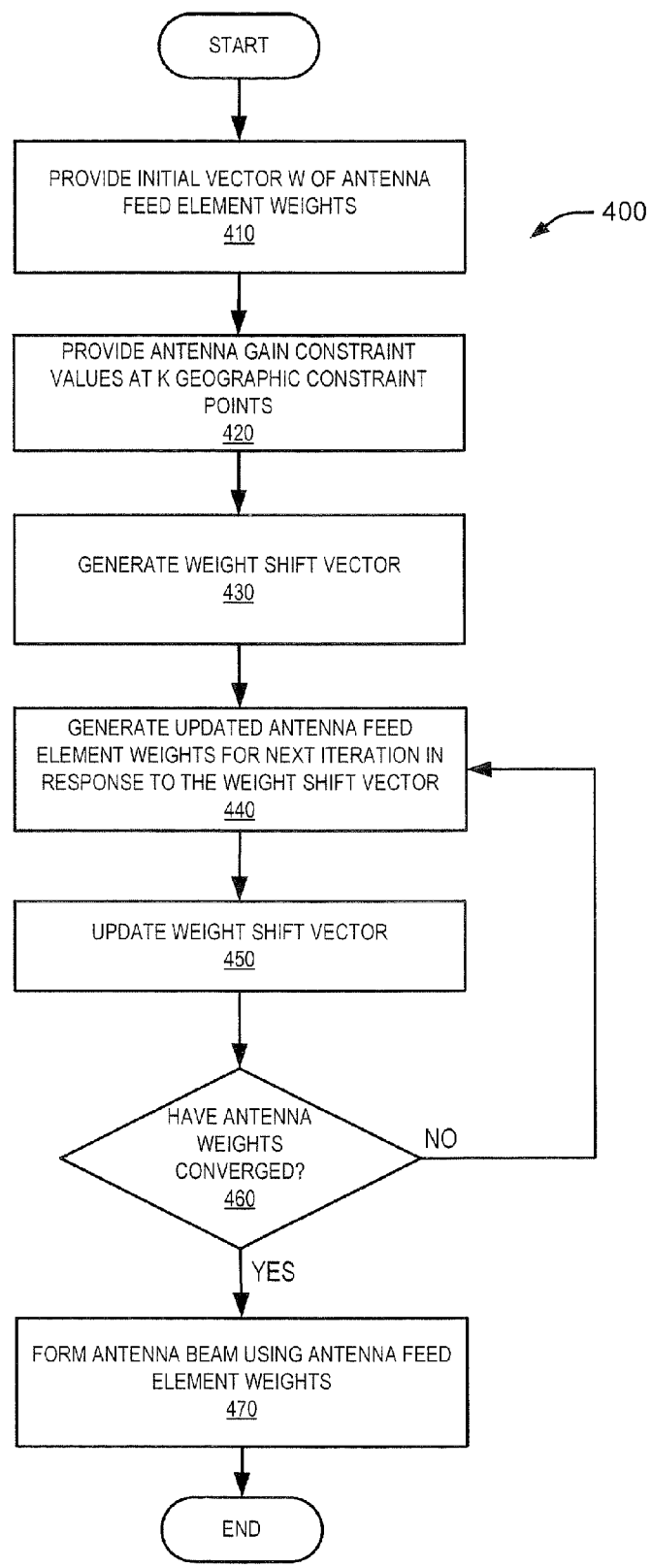

FIG. 6 is a flowchart illustrating operations 400 according to some embodiments of the invention. As shown therein, operations 400 according to some embodiments include providing an initial set of M complex valued antenna feed element weights $w_m$, for example, as the conjugate of a beam center steering vector (Block 410), and providing a plurality of antenna gain constraint values $g_k$ at K geographic constraint points (Block 420).

An initial weight shift vector $\Delta w$ is generated (Block 430), and the antenna feed element weights are updated in response to weight shift vector (Block 440). The weight shift vector is then updated based on the new antenna feed element weights (Block 450)

At Block 460, a determination is made as to whether the antenna weight vector has converged, for example, by comparing the value of the cost function at the updated antenna feed element weights to one or more previously calculated values of the cost function. If the antenna weight vector has not converged, a new set of weights is generated (Block 440), and the loop is continued.

Once the antenna weights have converged, an antenna beam is formed using the converged antenna feed element weights (Block 470).

In some particular embodiments, operations of beamforming systems/methods may be performed as follows:

1) Define an initial weight vector $w^1$ that may be chosen as conjugate of a beam center steering vector.
2) Specify the K constraint point gains, $g_k$, k=1, . . . K.
3) Specify the weighting factors, $\alpha_k$, k=1, . . . K. Default values are all ones.
4) Chose a proper step size $\mu$.
5) Form Q matrix according to Equation (30) that represents the partial derivatives of the K antenna beam gain responses with respect to the M feed element weights.
6) Form $\Delta g$ vector according to Equations (24) and (32) that represents differences between the actual and desired beam gain responses at each of the K locations of interest.
7) Using the Q matrix and the $\Delta g$ vector, compute the value of the cost function as defined in Equation (27).
8) Solve the Equation (29) for $\Delta w$
9) Compute the next updated weight vector $w^2$ according to Equation (33)
10) Repeat the Steps 5), 6), 7), 8) and 9) for the $i^{th}$ iteration.
11) Continue iterative process as long as $\xi^{i+1} < \xi^i$ until the values of cost function from two consecutive iterations are no longer decreasing or until the difference between successive values of the cost function are less than a threshold level.
12) Take the converged w, and normalize it as a final weight vector.

Section 4—Beam Forming Simulation Example

Figure 7:
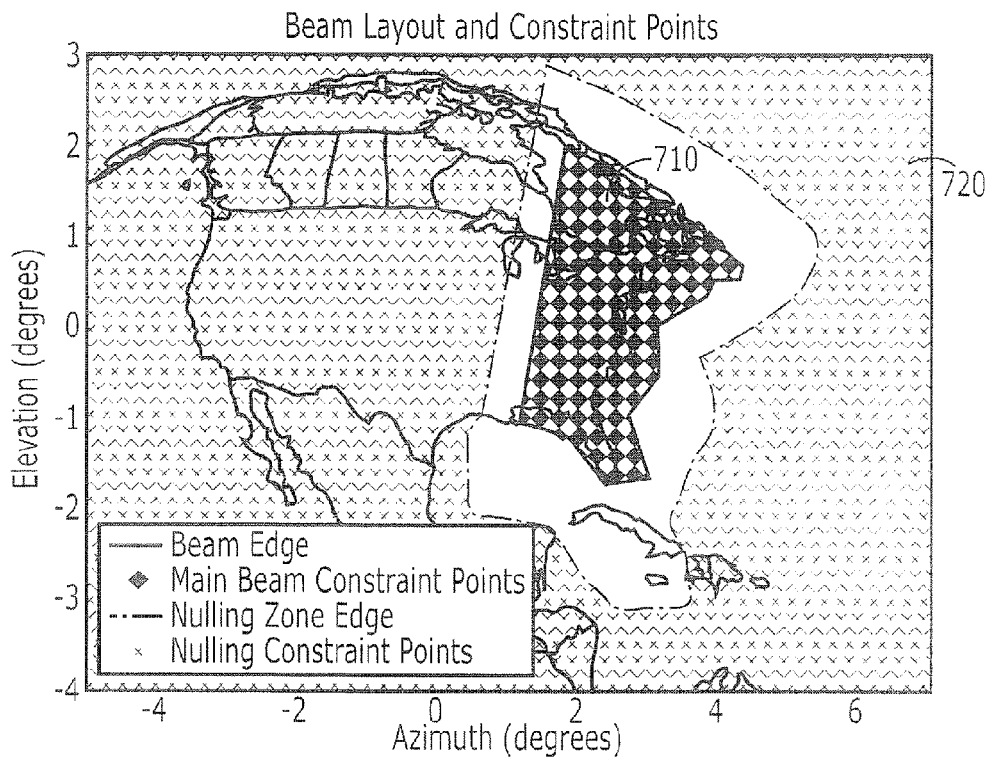
FIG. 7 illustrates exemplary gain constraint points used for simulating beamforming methods according to some embodiments.

The performance of beamforming systems/methods according to some embodiments are illustrated with a satellite beamforming example. For example, a satellite system that consists of 80 feed elements and that forms a large beam covering the east region of US and Canada has been simulated and analyzed. The beam layout and constraint points are shown in FIG. 7. The objective is to form a beam that is flat in the main beam coverage area 710 and low side lobes in a "nulling zone" 720. Note that unlike LCMV, the non-leaner least squares methods may have as many constraints points as desired. Accordingly, many zero and non-zero constraint points are illustrated in FIG. 7.

Figure 8:
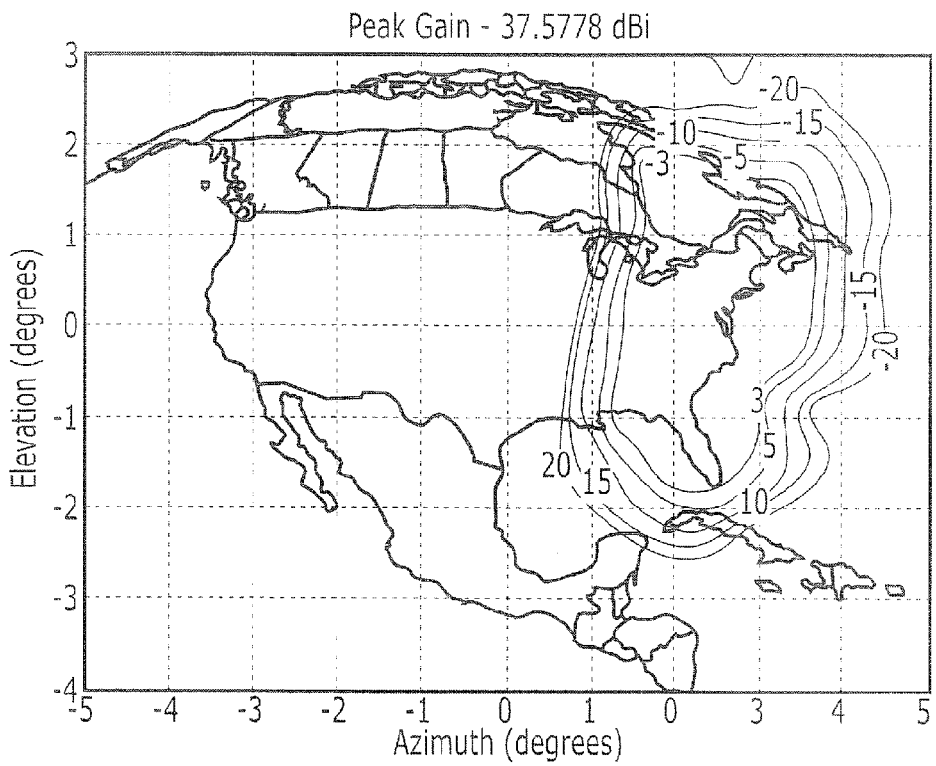
FIG. 8 illustrates beam gain contours (in dB) simulated using an iterative method according to some embodiments.

By using the feed data provided by a satellite manufacturer and the beam constraint requirement, the NLS adaptive gradient search method illustrated in FIG. 5 produces the beam having the gain contours shown in FIG. 8. The initial weight vector was chosen as conjugate of a beam center steering vector, while the step size used for the simulation was $5\times10^{-6}$. As shown in FIG. 8, the resulting beam is flat in the main beam coverage area 710, and the "nulling zone" 720 (where the side lobes are below −20 dB) is well shaped.

Figure 9:
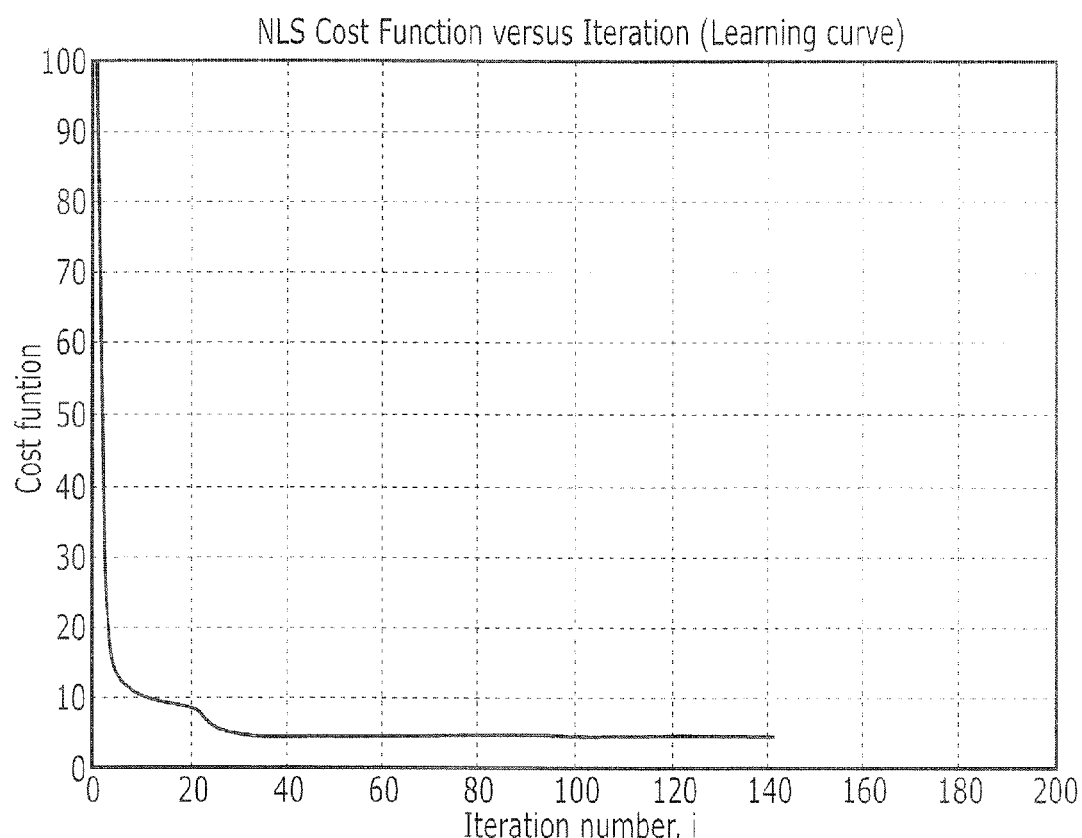
FIG. 9 is a graph that illustrates convergence of beamforming systems/methods according to some embodiments.

The algorithm is efficient and robust, as illustrated by the convergence curve in FIG. 9, which plots the value of the cost function $\xi$ (y-axis values) versus iteration number (x-axis values). For the typical iterative updating step size in this example, the algorithm takes about less than 100 iterations to converge.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of operating a transceiver including an antenna having a plurality of antenna feed elements, the method comprising:
    defining a plurality of antenna gain constraint values $g_k$ associated with K geographic constraint points within a geographic region;
    iteratively generating M antenna feed element weights $w_M$ in an antenna feed element weight vector $w \in C^{M \times 1}$ that result in antenna response values $f_K$ at the K geographic constraint points such that beam gain response values $|f_k|$ converge on the corresponding antenna gain constraint values $g_K$;
    forming an antenna beam from the antenna to the geographic region using the antenna feed element weights $w_M$; and
    communicating information over the antenna beam;
    wherein iteratively generating the antenna feed element weight vector w comprises:
    defining a cost function that relates the antenna beam gain constraint values $g_K$ to the antenna feed element weights $w_M$;
    specifying an initial vector $w^1$ of the antenna feed element weights $w_M$;
    evaluating the cost function using the initial vector $w^1$ of the antenna feed element weights $w_M$;
    generating a gradient of the cost function, and
    iteratively modifying the antenna feed element weight vector w and evaluating the cost function using the antenna feed element weight vector w while the value of the cost function is decreasing, wherein iteratively modifying the antenna feed element weight vector w comprises adjusting the antenna feed element weight vector w in the direction of the gradient of the cost function.

2. The method of claim 1, further comprising iteratively generating the M antenna feed element weights $w_M$ that result in antenna response values $f_K$ at the K geographic constraint points based on the corresponding antenna gain constraint values $g_K$ until the antenna feed element weights $w_M$ converge.

3. The method of claim 1, further comprising selecting a vector of the antenna feed element weights in response to the value of the cost function converging.

4. The method of claim 1 further comprising selecting a vector of the antenna feed element weights in response to the value of the cost function no longer decreasing in response to modifying the antenna weights.

5. The method of claim 1, wherein the initial weight vector comprises a conjugate of a beam steering center.

6. The method of claim 1, wherein adjusting the antenna weights comprises adjusting the weights by a fixed step size in the direction of the gradient of the cost function.

7. The method of claim 1, wherein the cost function comprises a sum of squared differences between the antenna gain constraint values $g_k$ and the antenna response values $f_k$ at the K geographic constraint points.

8. The method of claim 7, further comprising weighting the squared differences between the antenna gain constraint values $g_k$ and the antenna response values $f_k$ using weighting factors.

9. The method of claim 1, wherein iteratively modifying the antenna weights comprises adjusting the weights by a weight shift vector $\Delta w$.

10. The method of claim 9, further comprising generating the weight shift vector $\Delta w$ based on a set of linearized equations representing the antenna response values $f_k$ at the K geographic constraint points.

11. The method of claim 10, further comprising:
    generating a residual error vector in terms of the weight shift vector $\Delta w$;
    generating a matrix Q that represents partial derivatives of the K antenna beam gain responses with respect to the M feed element weights in response to the residual error vector;
    forming a vector $\Delta g$ that represents differences between the actual and desired beam gain responses at each of the K locations of interest;
    evaluating the cost function using the matrix Q and the vector $\Delta g$ to form a set of linear equations that relate the vector $\Delta g$ to the weight shift vector $\Delta w$; and
    solving the set of linear equations to find the weight shift vector $\Delta w$.

12. The method of claim 11, wherein the cost function comprises a sum of squared differences between the antenna gain constraint values $g_k$ and the antenna response values $f_k$ at the K geographic constraint points.

13. The method of claim 12, further comprising weighting the squared differences between the antenna gain constraint values $g_k$ and the antenna response values $f_k$ using weighting factors.

14. A transceiver, comprising:
    an antenna having a plurality of antenna feed elements; and
    an electronics system including a beam former configured to iteratively generate M antenna feed element weights $w_M$ in an antenna feed element weight vector $w \in C^{M \times 1}$ that result in antenna response values $f_K$ at K geographic constraint points based on corresponding antenna gain constraint values $g_K$, and to form an antenna beam from the antenna to the geographic region using the antenna feed element weights;
    wherein the beam former is further configured to define a cost function that relates the beam gain constraint values $g_K$ to the antenna feed element weights $w_M$, to specify an initial vector $w^1$ of the antenna feed element weights $w_M$, to evaluate the cost function using the initial vector $w^1$ of the antenna feed element weights $w_M$, to iteratively modify the antenna feed element weight vector w and evaluate the cost function using the antenna feed element weight vector w while the value of the cost function is decreasing such that beam gain response values $|f_k|$ converge towards the beam gain constraint values $g_k$; and wherein the beam former is further configured to generate a gradient of the cost function and to adjust the antenna feed element weight vector w in the direction of the gradient of the cost function.

15. The transceiver of claim 14, wherein the beam former is configured to iteratively generate M antenna feed element weights $w_M$ that result in antenna response values $f_K$ at K geographic constraint points based on corresponding antenna gain constraint values $g_K$ until the antenna feed element weights $w_M$ converge.

16. The transceiver of claim 14, wherein the beam former is further configured to select a vector of the antenna feed element weights in response to the value of the cost function converging.

17. The transceiver of claim 14, wherein the beam former is further configured to select a vector of the antenna feed element weights in response to the value of the cost function no longer decreasing in response to modifying the antenna weights.

18. The transceiver of claim 14, wherein the initial weight vector comprises a conjugate of a beam steering center.

19. The transceiver of claim 14, wherein the beam former is further configured adjust the antenna weights by a fixed step size in the direction of the gradient of the cost function.

20. The transceiver of claim 14, wherein the cost function comprises a sum of squared differences between the antenna gain constraint values $g_k$ and the antenna response values $f_k$ at the K geographic constraint points.

21. The transceiver of claim 20, wherein the beam former is further configured to weight the squared differences between the antenna gain constraint values $g_k$ and the antenna response values $f_k$ using weighting factors.

22. The transceiver of claim 14, wherein the beam former is further configured to modify the antenna weights by adjusting the weights by a weight shift vector $\Delta w$.

23. The transceiver of claim 22, wherein the beam former is further configured to generate the weight shift vector $\Delta w$ based on a set of linearized equations representing the antenna response values $f_k$ at the K geographic constraint points.

24. The transceiver of claim 23, wherein the beam former is further configured to:
generate a residual error vector in terms of the weight shift vector $\Delta w$;
generate a matrix Q that represents partial derivatives of the K antenna beam gain responses with respect to the M feed element weights in response to the residual error vector;
form a vector $\Delta g$ that represents differences between the actual and desired beam gain responses at each of the K locations of interest;
evaluate the cost function using the matrix Q and the vector $\Delta g$ to form a set of linear equations that relate the vector $\Delta g$ to the weight shift vector $\Delta w$; and
solve the set of linear equations to find the weight shift vector $\Delta w$.

25. The transceiver of claim 24, wherein the cost function comprises a sum of squared differences between the antenna gain constraint values $g_k$ and the antenna response values $f_k$ at the K geographic constraint points.

26. The transceiver of claim 25, wherein the beam former is further configured to weight the squared differences between the antenna gain constraint values $g_k$ and the antenna response values $f_k$ using weighting factors.

27. A communications satellite, comprising:
an antenna having a plurality of antenna feed elements; and
an electronics system including a beam former configured to iteratively generate M antenna feed element weights $w_M$ in an antenna feed element weight vector $w \in C^{M \times 1}$ that result in antenna response values $f_K$ at K geographic constraint points based on corresponding antenna gain constraint values $g_K$, and to form an antenna beam from the antenna to the geographic region using the antenna feed element weights;
wherein the beam former is further configured to define a cost function that relates the beam gain constraint values $g_K$ to the antenna feed element weights $w_M$, to specify an initial vector $w^1$ of the antenna feed element weights $w_M$, to evaluate the cost function using the initial vector $w^1$ of the antenna feed element weights $w_M$, to iteratively modify the antenna feed element weight vector w and evaluate the cost function using the antenna feed element weight vector w while the value of the cost function is decreasing such that beam gain response values $|f_k|$ converge towards the beam gain constraint values $g_k$; and
wherein the beam former is further configured to generate a gradient of the cost function and to adjust the antenna feed element weight vector w in the direction of the gradient of the cost function.

28. A satellite gateway, comprising:
an electronics system including a beam former configured to iteratively generate M antenna feed element weights $w_M$ in an antenna feed element weight vector $w \in C^{M \times 1}$ for antenna feed elements of an antenna of a remote satellite that result in antenna response values $f_K$ at K geographic constraint points based on corresponding antenna gain constraint values $g_K$, and to transmit the complex valued antenna feed element weights to the satellite for use in forming an antenna beam from the satellite antenna to the geographic region; and
wherein the beam former is further configured to define a cost function that relates the beam gain constraint values $g_K$ to the antenna feed element weights $w_M$, to specify an initial vector $w^1$ of the antenna feed element weights $w_M$, to evaluate the cost function using the initial vector $w^1$ of the antenna feed element weights $w_M$, to iteratively modify the antenna feed element weight vector w and evaluate the cost function using the antenna feed element weight vector w while the value of the cost function is decreasing such that beam gain response values $|f_k|$ converge towards the beam gain constraint values $g_k$; and
wherein the beam former is further configured to generate a gradient of the cost function and to adjust the antenna feed element weight vector w in the direction of the gradient of the cost function.

* * * * *

UNITED STATES PATENT AND TRADEMARK OFFICE
CERTIFICATE OF CORRECTION

PATENT NO.        : 8,193,975 B2
APPLICATION NO.   : 12/603911
DATED             : June 5, 2012
INVENTOR(S)       : Zheng Page 1 of 1

It is certified that error appears in the above-identified patent and that said Letters Patent is hereby corrected as shown below:

In the Drawings: Please replace FIGURE 8 as follows:

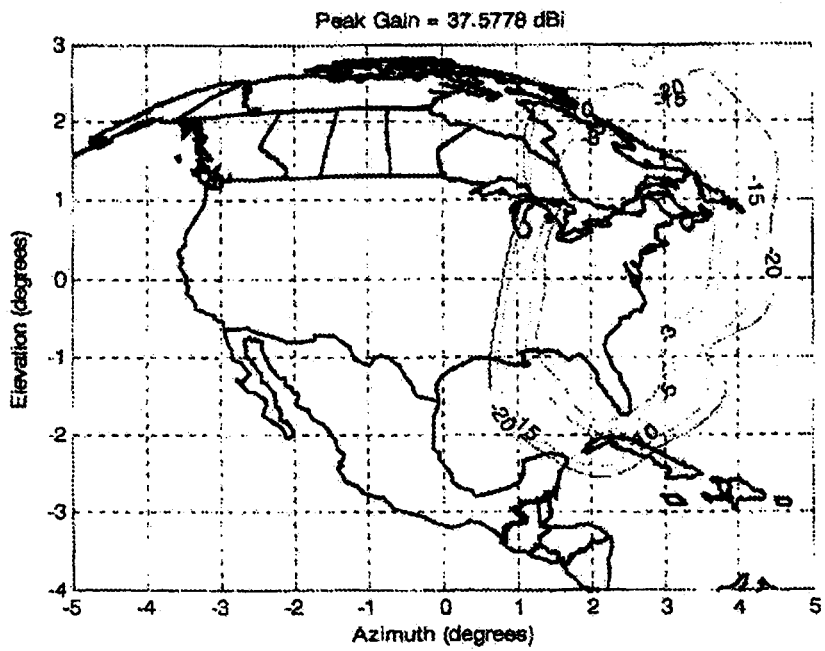

FIGURE 8

Signed and Sealed this
Twenty-sixth Day of March, 2013

Teresa Stanek Rea
*Acting Director of the United States Patent and Trademark Office*